(12) United States Patent
Kim

(10) Patent No.: US 11,960,460 B2
(45) Date of Patent: *Apr. 16, 2024

(54) METHOD, APPARATUS, AND COMPUTER PROGRAM STORED IN COMPUTER READABLE MEDIUM FOR CONDUCTING ARITHMETIC OPERATION EFFICIENTLY IN DATABASE MANAGEMENT SERVER

(71) Applicant: TmaxTibero Co., Ltd., Gyeonggi-do (KR)

(72) Inventor: Dohyeong Kim, Gyeonggi-do (KR)

(73) Assignee: TmaxTibero Co., Ltd., Gyeonggi-Do (KR)

(*) Notice: Subject to any disclaimer, the term of this patent is extended or adjusted under 35 U.S.C. 154(b) by 663 days.

This patent is subject to a terminal disclaimer.

(21) Appl. No.: 17/107,747

(22) Filed: Nov. 30, 2020

(65) Prior Publication Data

US 2021/0081384 A1 Mar. 18, 2021

Related U.S. Application Data

(63) Continuation of application No. 15/696,009, filed on Sep. 5, 2017, now Pat. No. 10,885,006.

(30) Foreign Application Priority Data

Aug. 9, 2017 (KR) .................. 10-2017-0100997

(51) Int. Cl.
*G06F 16/22* (2019.01)
*G06F 7/483* (2006.01)
(Continued)

(52) U.S. Cl.
CPC ........ *G06F 16/2219* (2019.01); *G06F 7/4836* (2013.01); *G06F 7/491* (2013.01);
(Continued)

(58) Field of Classification Search
CPC .... G06F 16/2219; G06F 7/4836; G06F 7/491; G06F 7/76; G06F 16/00; G06F 16/90335
See application file for complete search history.

(56) References Cited

U.S. PATENT DOCUMENTS 6,546,411 B1 4/2003 Singh
2008/0281891 A1 11/2008 Carroll
(Continued)

FOREIGN PATENT DOCUMENTS

KR 10-1714412 B1 3/2017

OTHER PUBLICATIONS

Carry-save adder, Wikipedia entry with example calculation, May 2016, retrieved from https://web.archive.org/web/20160513132437/https://en.wikipedia.org/wiki/Carry-save_adder (Year: 2016), pp. 1-3.

*Primary Examiner* — Albert M Phillips, III
(74) *Attorney, Agent, or Firm* — Martin & Ferraro, LLP

(57) ABSTRACT

Provided are a method, an apparatus, and a computer program stored in a computer readable medium for conducting an arithmetic operation efficiently in a database management server. In a computer-readable medium including a computer program including encoded commands, which is configured to cause one or more processors to perform operations when the computer program is executed by the one or more processors of a computer system, the operations include: an operation of receiving a structure body creation request for performing a predetermined arithmetic operation; an operation of creating a structure body in response to the structure body creation request; an operation of receiving an arithmetic operation processing request of requesting processing of the predetermined arithmetic operation with respect to a plurality of numerical values; an operation of creating structure body number data for each of the plurality of numerical values by applying each of the plurality of
(Continued)

numerical values to the created structure body, the created structure body including one or more array elements and at least some numerical values being allocated to the one or more array elements to create the structure body number data; and an operation of performing the predetermined arithmetic operation based on the structure body number data for each of the plurality of numerical values.

9 Claims, 7 Drawing Sheets

(51) Int. Cl.
  *G06F 7/491* (2006.01)
  *G06F 7/76* (2006.01)
  *G06F 16/00* (2019.01)
  *G06F 16/903* (2019.01)
(52) U.S. Cl.
  CPC ............... *G06F 7/76* (2013.01); *G06F 16/00* (2019.01); *G06F 16/90335* (2019.01)

(56) References Cited

U.S. PATENT DOCUMENTS

| | | |
|---|---|---|
| 2014/0208069 A1 | 7/2014 | Wegener |
| 2015/0026227 A1 | 1/2015 | Xu |
| 2015/0293747 A1 | 10/2015 | Brooks |
| 2017/0068518 A1 | 3/2017 | Kim et al. |

Fig. 4A

```
Struct number_agg_s {
        int64_t coef[128];
} typedef number_agg_s number_agg_t
```

Fig. 4B

| | 0 | ... | 62 | 63 | 64 | ... | 127 |
|---|---|---|---|---|---|---|---|
| number_agg_t | 0 | ... | 0 | 10 | 3723 | ... | |

$100^0$ $100^{-1}$ $100^{-2}$

METHOD, APPARATUS, AND COMPUTER PROGRAM STORED IN COMPUTER READABLE MEDIUM FOR CONDUCTING ARITHMETIC OPERATION EFFICIENTLY IN DATABASE MANAGEMENT SERVER

CROSS-REFERENCE TO RELATED APPLICATIONS

This application is a continuation of U.S. application Ser. No. 15/696,009 filed Sep. 5, 2017 which claims priority to and the benefit of Korean Patent Application No. 10-2017-0100997 filed in the Korean Intellectual Property Office on Aug. 9, 2017, the entire contents of which are incorporated herein by reference.

TECHNICAL FIELD

The present disclosure relates to a method for efficiently performing a cumulative arithmetic operation in a database system.

BACKGROUND ART

A database system may collect, store, manage, and analyze data. In recent years, techniques for large-scale database management systems have been developed, including large amounts of fixed or unstructured data sets and big data processing that extracts values from these data and analyzes the results.

A basic variable type which may express a number in a C language includes int, float, and double types. As a limit of the basic variable type, the int type may store only integers that may be expressed by only 8 bits, and the float and double types may express the number by using floating points in most cases. Therefore, although it is possible to express a large number or a small number in a significant digit, there is a disadvantage in that the large or small number may not be expressed accurately due to a difference between a binary number and a decimal number. In addition, when complex operations are cumulatively continued, there is a possibility that performance will be lowered due to overhead which occurs.

Therefore, there is a need for a method for efficiently performing operations in a database management system.

SUMMARY OF THE INVENTION

The present disclosure has been made in an effort to efficiently perform arithmetic operations in a database system.

An exemplary embodiment of the present disclosure provides a computer-readable medium including a computer program including encoded commands, which is configured to cause one or more processors to perform operations when the computer program is executed by the one or more processors of a computer system and the operations include an operation of receiving a structure body creation request for performing a predetermined arithmetic operation; an operation of creating a structure body in response to the structure body creation request; an operation of receiving an arithmetic operation processing request of requesting processing of the predetermined arithmetic operation with respect to a plurality of numerical values; an operation of creating structure body number data for each of the plurality of numerical values by applying each of the plurality of numerical values to the created structure body, the created structure body including one or more array elements and at least some numerical values being allocated to the one or more array elements to create the structure body number data; and an operation of performing the predetermined arithmetic operation based on the structure body number data for each of the plurality of numerical values.

Another exemplary embodiment of the present disclosure provides a computer-readable medium including a computer program which is configured to cause one or more processors to perform operations when the computer program is executed by the one or more processors of a computer system and the operations include an operation of receiving a structure body creation request for performing a predetermined arithmetic operation; an operation of creating a structure body in response to the structure body creation request; an operation of receiving an arithmetic operation processing request of requesting processing of the predetermined arithmetic operation with respect to a plurality of numerical values; an operation of creating structure body number data for each of the plurality of numerical values by applying each of the plurality of numerical values to the created structure body, the created structure body including one or more array elements and at least some numerical values being allocated to the one or more array elements to create the structure body number data; and an operation of performing the predetermined arithmetic operation based on the structure body number data for each of the plurality of numerical values.

Yet another exemplary embodiment of the present disclosure provides server performing a predetermined arithmetic operation, including: a structure body creating unit receiving a structure body creation request for performing a predetermined arithmetic operation and creating a structure body in response to the structure body creation request; a structure body number data creating unit creating structure body number data for each of the plurality of numerical values by applying each of the plurality of numerical values to the created structure body when receiving an arithmetic operation processing request of requesting the predetermined arithmetic operation for a plurality of numerical values, the created structure body including one or more array elements and at least some numerical values being allocated to the one or more array elements to create the structure body number data; and an arithmetic operation performing unit performing the predetermined arithmetic operation based on the structure body number data for each of the plurality of numerical values.

According to an exemplary embodiment of the present disclosure, provided is a method for efficiently performing arithmetic operations in a data system.

BRIEF DESCRIPTION OF THE DRAWINGS

Various aspects are now described with reference to the drawings and like reference numerals are generally used to designate like elements. In the following exemplary embodiments, for a description purpose, multiple specific detailed matters are presented to provide general understanding of one or more aspects. However, it will be apparent that the aspect(s) can be executed without the detailed matters. In other examples, known structures and apparatuses are illustrated in a block diagram form in order to facilitate description of the one or more aspects.

FIGS. 4A and 4B are diagrams for describing a method for creating a structure body according to an exemplary embodiment of the present disclosure.

DETAILED DESCRIPTION

Figure 1:
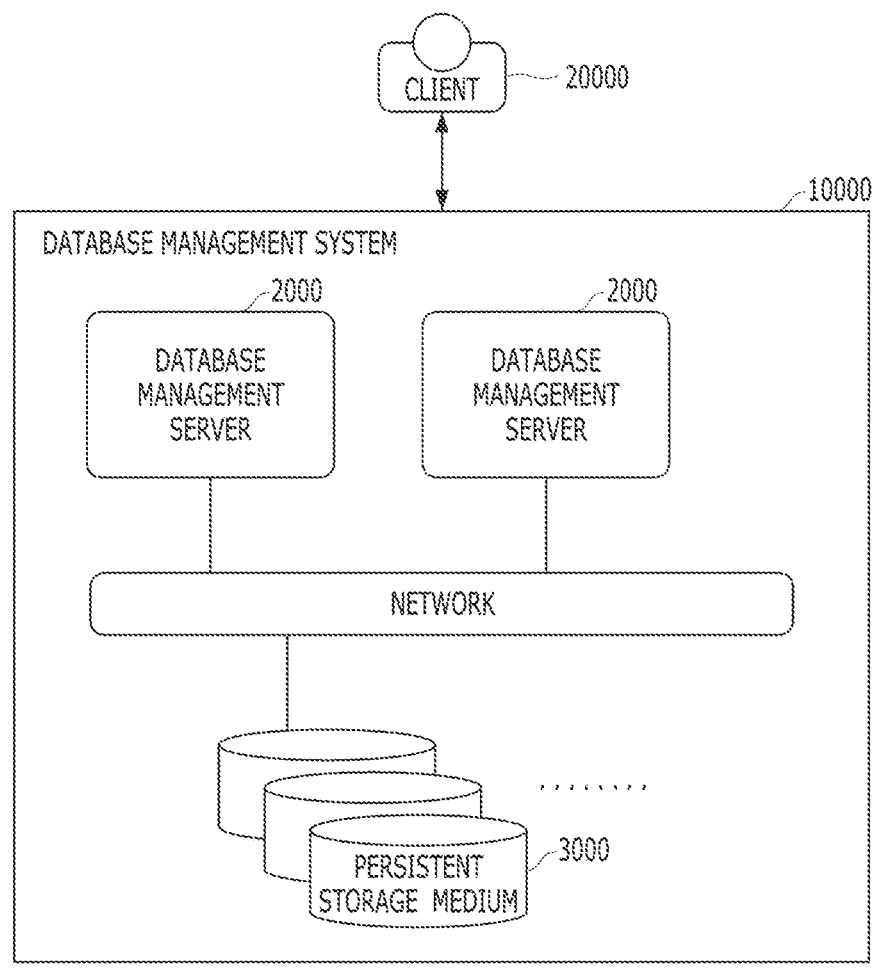
FIG. 1 exemplarily illustrates a database system according to an exemplary embodiment of the present disclosure.

Various exemplary embodiments will be now described with reference to drawings and like reference numerals are used to refer to like elements throughout all drawings. In the present specification, various descriptions are presented to provide appreciation of the present disclosure. However, it is apparent that the exemplary embodiments can be executed without the specific description. In other examples, known structures and apparatuses are presented in a block diagram form in order to facilitate description of the exemplary embodiments.

"Component", "module", "system", and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside in the processor and/or the execution thread and one component may be localized in one computer or distributed among two or more computers. Further, the components may be executed by various computer-readable media having various data structures, which are stored therein. The components may perform communication through local and/or remote processing according to a signal (for example, data from one component that interacts with other components and/or data through another system and a network such as the Internet through a signal in a local system and a distribution system) having one or more data packets, for example.

In the present disclosure, a database means a system that stores data associated with each other in a computer processible format. The database may store data and answer a question of a user and the data stored in the database may be changed. The database may store new data and perform operations of deleting and changing the existing data.

In the present specification, a transaction means a consecutive processing unit for a series of operations such as exchange of information or database update. The transaction may be defined as a basic unit of an operation for accomplishing an operation requested while integrity of the database is guaranteed.

In the present disclosure, a block may mean a chunk of data. For example, the block may include one table storing the data and include a plurality of tables. The block may have various sizes. For example, the block may have sizes including 10 kb, 100 kb, 1 mega byte, 2 mega bytes, 3 mega bytes, 4 mega bytes, and the like and is not limited thereto.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be analyzed within the widest range which is coherent with the principles and new features presented herein.

Hereinafter, exemplary embodiments according to the present disclosure will be described in detail with reference to the accompanying drawings.

FIG. 1 exemplarily illustrates a database system according to an exemplary embodiment of the present disclosure.

The database management system 10000 may include at least one database management server 2000 and at least one persistent storage medium 3000.

The database management server 2000 may include a predetermined type of computer system or computer device such as a microprocessor, a mainframe computer, a digital single processor, a portable device, and a device controller.

A client 20000 may mean nodes in a database system having a mechanism for communication through a network. For example, the client 20000 may include a predetermined electronic device having connectivity with a personal computer (PC), a laptop computer, a workstation, a terminal, and/or the network. Further, the client 20000 may include a predetermined server implemented by at least one of agent, application programming interface (API), and plug-in.

The database server 2000 may include a memory (not illustrated). The database management server 2000 may perform a database operation by using the memory. For example, when the database management server 2000 performs a transaction, the database management server 2000 may load data from the persistent storage medium 3000 and store the loaded data in at least a part of the memory (not illustrated). In this case, the transaction may include the arithmetic operation of the numerical values.

The memory (not illustrated) as a primary storage device directly accessed by the processor, such as a random access memory (RAM) including a dynamic random access memory (DRAM), a static random access memory (SRAM), etc., may mean a volatile storage device in which stored information is momentarily erased when power is turned off, but is not limited thereto. The memory may be operated by a processor.

According to the exemplary embodiment of the present disclosure, the database management server 2000 may cumulatively perform a predetermined arithmetic operation for a plurality of numerical values. For example, the database management server 2000 may cumulatively perform an addition arithmetic operation for three or more values. In this case, when the number of times of the predetermined arithmetic operation is large, in the case where a carrier arithmetic operation is performed whenever the arithmetic operation is performed, an arithmetic operation processing speed decreases and the use of the memory increases.

According to the exemplary embodiment of the present disclosure, when the database management server 2000 cumulatively performs a plurality of predetermined arithmetic operations, the database management server 2000 performs the carry arithmetic operation last to increase the arithmetic operation processing speed.

The persistent storage medium 3000 may be implemented by a non-volatile storage medium which may continuously store predetermined data. For example, the persistent storage medium 3000 may be implemented by a storage device based on a flash memory and/or a battery back-up memory in addition to a disk, an optical disk, and a magneto-optical storage device and is not limited thereto.

Figure 2:
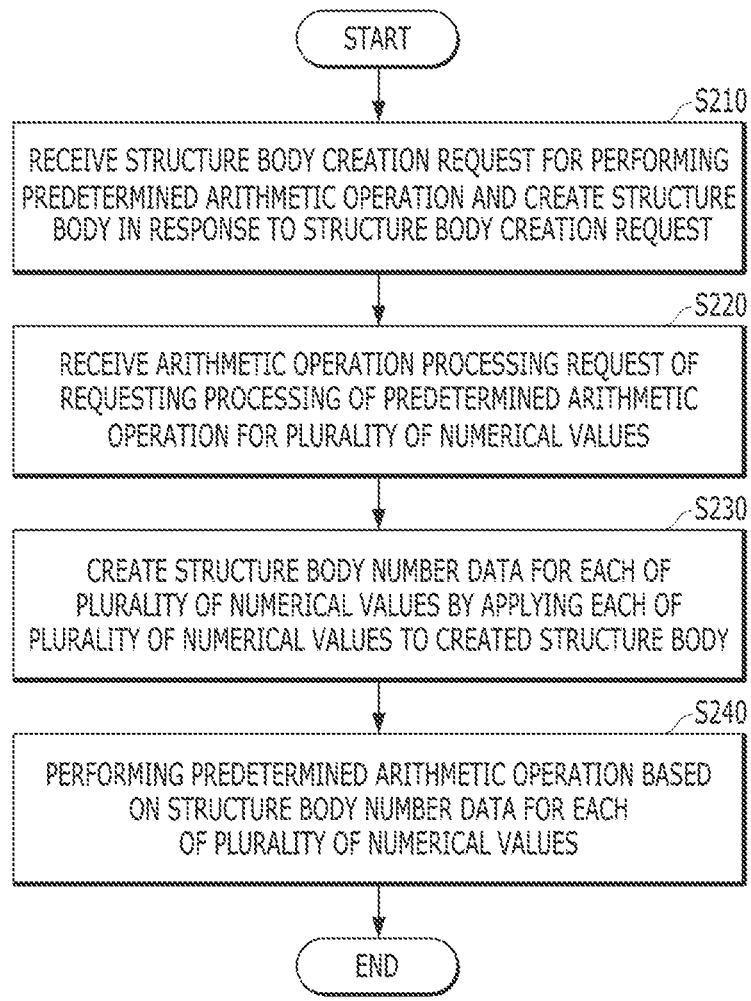
FIG. 2 is a diagram for describing a method for performing a predetermined arithmetic operation by a database management server 2000 according to an exemplary embodiment of the present disclosure.

FIG. 2 is a diagram for describing a method for performing a predetermined arithmetic operation by a database management server 2000 according to an exemplary embodiment of the present disclosure.

According to the exemplary embodiment of the present disclosure, in step S210, the database management server 2000 may receive a structure body creation request for performing a predetermined arithmetic operation. For example, the database management server 2000 may receive the structure body creation request from the client 20000 and create a structure body in response thereto. The structure body may mean a data processing scheme that binds data and processes the bound data by one unit and according to the exemplary embodiment of the present disclosure, the structure body may include one or more array elements. In this case, a plurality of structure bodies may be created and is not limited thereto.

Each of one or more array elements included in the structure body may represent a predetermined multiplier of a specific number. For example, a first array element included in a specific structure body may represent $100^{-1}$, a second array element may represent $100^0$, and a third array element may represent $100^1$. In this case, the numerical value, 1 included in the first array element represents $100^{-1}$, the numerical value, 10 included in the second array element represents $10*100^0$, and the numerical value, 3 included in the third array element represents $3*100^1$.

As another example, the first array element included in the specific structure body may represent 2-1, the second array element may represent 20, and the third array element may represent 21 and are not limited thereto.

In this case, the number of one or more array elements included in the structure body may be diversified. For example, the structure body may include 128 array elements and is not limited thereto. In this case, a plurality of structure bodies may be created and the numbers of array elements of the plurality of respective structure bodies may be different from each other.

In step S220, the database management server 2000 may receive an arithmetic operation processing request of requesting processing of a predetermined arithmetic operation for a plurality of numerical values. For example, the database management server 2000 may receive a processing request of an additional arithmetic operation for the plurality of numerical values. In this case, the predetermined arithmetic operation may be diversified. For example, the predetermined arithmetic operation may include an addition arithmetic operation, a subtraction arithmetic operation, a multiplication arithmetic operation, and a division arithmetic operation and is not limited thereto.

In step S230, the database management server 2000 applies each of the plurality of numerical values to the created structure body to create structure body number data for each of the plurality of numerical values. For example, the database management server 2000 applies a first numerical value to the structure body to create first structure body number data. Further, the database management server 2000 applies a second numerical value to the structure body to create second structure body number data.

In this case, the database management server 2000 allocates at least some numerical values to one or more respective array elements to create the structure body number data. For example, the database management server 2000 may allocate at least some numerical values to one or more respective array elements based on "a predetermined multiplier of a specific number" represented by the array element. In detail, for example, when the database management server 2000 applies a numerical value "1234" to the structure body, the database management server 2000 allocates "1200" to the array element representing $100^1$ and allocates "34" to the array element representing $100^0$ to create the structure body number data. In this case, the structure body number data may possess "12" in the array element representing $100^1$ and "34" in the array element representing $100^0$.

In step S240, the database management server 2000 may perform the predetermined arithmetic operation based on the structure body number data for each of the plurality of numerical values.

According to the exemplary embodiment of the present disclosure, the database management server 2000 performs the predetermined arithmetic operation for the structure body number data for each of the plurality of numerical values to acquire first arithmetic operation result data.

In this case, the database management server 2000 may perform the predetermined arithmetic operation between the array elements representing the same multiplier of the specific number.

For example, it is assumed that the first array element (the first array element represents $100^{-1}$) of the first structure body number data includes the numerical value, 2, the second array element (the second array element represents $100^0$) includes the numerical value, 10, the third array element (the third array element represents $100^1$) includes the numerical value, 3, and the first array element (the first array element represents $100^{-1}$) of the second structure body number data includes the numerical value, 4, the second array element (the second array element represents $100^0$) includes the numerical value, 7, and the third array element (the third array element represents $100^1$) includes the numerical value, 9.

In this case, the database management server 2000 may perform the arithmetic operation (e.g., the addition arithmetic operation) for the numerical value included in the first array element of the first structure body number data which is the array in which the predetermined multiplier is identical and the numerical value included in the first array element of the second structure body number data. Further, the database management server 2000 may perform the arithmetic operation (e.g., the addition arithmetic operation) for the numerical value included in the second array element of the first structure body number data and the numerical value included in the second array element of the second structure body number data and perform the arithmetic operation (e.g., the addition arithmetic operation) for the numerical value included in the third array element of the first structure body number data and the numerical value included in the third array element of the second structure body number data. As a result, the database management server 2000 may acquire the first arithmetic operation result data having 6 (the sum of 2 and 4) in the first array element, 17 (the sum of 10 and 7) in the second array element, and 12 (the sum of 3 and 9) in the third array element.

In this case, the database management server 2000 cumulatively performs the predetermined arithmetic operation multiple times to acquire the first arithmetic operation result data. For example, the database management server 2000 may cumulatively perform the predetermined arithmetic operation for three or more structure body number data and is not limited thereto.

In a process of acquiring the first arithmetic operation result data, the database management server 2000 may skip the carry arithmetic operation. The carry arithmetic operation includes at least one of a carry up arithmetic operation and a carry down arithmetic operation. For example, as a result of the arithmetic operation of the structure number data, even when the numerical value included in the first array element (e.g., when the array element represents $S^N$, S represents a natural number and N represents an integer) of the first arithmetic operation result data is more than S, the database management server 2000 may skip the carry up arithmetic operation (e.g., an arithmetic operation of carrying up a part equal to or more than S to an array element representing $S^{N+1}$). As a result, the array element (e.g., a case where the array element represents a predetermined multiplier value $S^N$ of a specific number S) of the first arithmetic operation result data may include a number larger than the specific number S.

In this case, the database management server 2000 may perform the predetermined arithmetic operation multiple times without performing the carry arithmetic operation. For example, even when the numerical value included in the array element representing $S^N$ is more than S, the database management server 2000 continuously performs the predetermined arithmetic operation for the numerical value included in the array element without performing the carry arithmetic operation to acquire the first arithmetic operation result data.

According to the exemplary embodiment of the present disclosure, the database management server 2000 performs the carry arithmetic operation for the first arithmetic operation result data to acquire second arithmetic operation result data. For example, the database management server 2000 performs the carry up arithmetic operation for the respective numerical values included in the array element of the first arithmetic operation result data to acquire the second arithmetic operation result data.

According to the exemplary embodiment of the present disclosure, the database management server 2000 may convert the second arithmetic operation result data into the numerical value. For example, the database management server 2000 converts the second arithmetic operation result data which exists as a type applied to the structure body into a predetermined number type to acquire the numerical value.

According to the exemplary embodiment of the present disclosure, the database management server 2000 performs the carry arithmetic operation in a last arithmetic operation to increase utilization of the memory and more rapidly perform the arithmetic operation.

Figure 3:
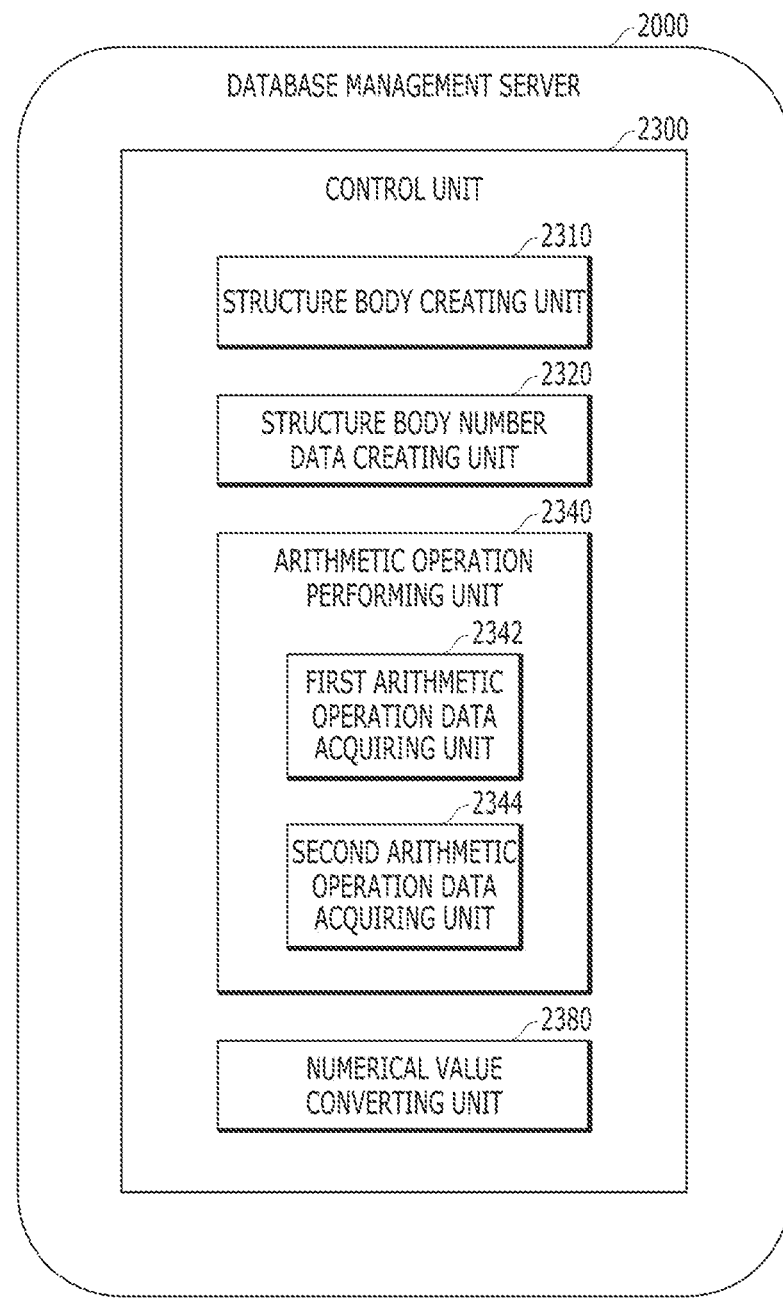
FIG. 3 exemplarily illustrates components of the database management server according to the exemplary embodiment of the present disclosure.

FIG. 3 exemplarily illustrates components of the database management server according to the exemplary embodiment of the present disclosure.

According to the exemplary embodiment of the present disclosure, the database management server 2000 may include a control unit 2300 and the control unit 2300 may include a structure body creating unit 2310, a structure body number data creating unit 2320, an arithmetic operation performing unit 2340, and a numerical value converting unit 2380. Further, the arithmetic operation performing unit 2340 may include a first arithmetic operation data acquiring unit 2342 and a second arithmetic operation data acquiring unit 2344. The control unit 2300 may be implemented by one processor and implemented by a plurality of processors and is not limited thereto.

According to the exemplary embodiment of the present disclosure, the database management server 2000 may receive the structure body creation request for performing the predetermined arithmetic operation. For example, the database management server 2000 may receive the structure body creation request from the client 20000 and the structure body creating unit 2310 may create the structure body in response thereto.

According to the exemplary embodiment of the present disclosure, the database management server 2000 may receive the arithmetic operation processing request of requesting the processing of the predetermined arithmetic operation for the plurality of numerical values. For example, the database management server 2000 may receive the process request of the addition arithmetic operation for the plurality of numerical values. In this case, the predetermined arithmetic operation may be diversified. For example, the predetermined arithmetic operation may include the addition arithmetic operation, the subtraction arithmetic operation, the multiplication arithmetic operation, and the division arithmetic operation and is not limited thereto.

The structure body number data creating unit 2320 of the database management server 2000 applies each of the plurality of numerical values to the created structure body to create the structure body number data for each of the plurality of numerical values. For example, the database management server 2000 applies the first numerical value to the structure body to create the first structure body number data. Further, the database management server 2000 applies the second numerical value to the structure body to create the second structure body number data.

In this case, the structure body number data creating unit 2320 of the database management server 2000 allocates at least some numerical values to one or more respective array elements to create the structure body number data. For example, when the structure body number data creating unit 2320 of the database management server 2000 applies a numerical value "1234" to the structure body, the structure body number data creating unit 2320 allocates "1200" to the array element representing $100^1$ and allocates "34" to the array element representing $100^0$ to create the structure body number data. In this case, the structure body number data may possess "12" in the array element representing $100^1$ and "34" in the array element representing $100^0$.

The arithmetic operation performing unit 2340 of the database management server 2000 may perform the predetermined arithmetic operation based on the structure body number data for each of the plurality of numerical values.

The first arithmetic operation data acquiring unit 2342 of the database management server 2000 performs the predetermined arithmetic operation for the structure body number data for each of the plurality of numerical values to acquire the first arithmetic operation result data.

In this case, the first arithmetic operation data acquiring unit 2342 of the database management server 2000 may perform the predetermined arithmetic operation between the values included in the array element in which the predetermined multiplier is identical.

For example, it is assumed that the first array element (the first array element represents $100^{-1}$) of the first structure body number data includes the numerical value, 2, the second array element (the second array element represents $100^0$) includes the numerical value, 10, the third array element (the third array element represents $100^1$) includes the numerical value, 3, and the first array element (the first array element represents $100^{-1}$) of the second structure body number data includes the numerical value, 4, the second array element (the second array element represents $100^0$) includes the numerical value, 7, and the third array element (the third array element represents $100^1$) includes the numerical value, 9.

In this case, the first arithmetic operation data acquiring unit 2342 of the database management server 2000 may perform the arithmetic operation (e.g., the addition arithmetic operation) for the numerical value included in the first array element of the first structure body number data which is the array in which the predetermined multiplier is identical and the numerical value included in the first array element of the second structure body number data. Further, the first arithmetic operation data acquiring unit 2342 of the database management server 2000 may perform the arithmetic operation (e.g., the addition arithmetic operation) for the numerical value included in the second array element of the first structure body number data and the numerical value included in the second array element of the second structure body number data and perform the arithmetic operation (e.g., the addition arithmetic operation) for the numerical value included in the third array element of the first structure body number data and the numerical value included in the third array element of the second structure body number data. As a result, the first arithmetic operation data acquiring unit 2342 of the database management server 2000 may acquire the first arithmetic operation result data having 6 (the sum of 2 and 4) in the first array element, 17 (the sum of 10 and 7) in the second array element, and 12 (the sum of 3 and 9) in the third array element.

In this case, the first arithmetic operation data acquiring unit 2342 of the database management server 2000 cumulatively performs the predetermined arithmetic operation multiple times to acquire the first arithmetic operation result data. For example, the first arithmetic operation data acquiring unit 2342 of the database management server 2000 may cumulatively perform the predetermined arithmetic operation for three or more structure body number data and is not limited thereto.

In the process of acquiring the first arithmetic operation result data, the first arithmetic operation data acquiring unit 2342 of the database management server 2000 may skip the carry arithmetic operation. The carry arithmetic operation includes at least one of the carry up arithmetic operation and the carry down arithmetic operation. For example, as a result of the arithmetic operation of the structure body number data, even when the numerical value included in the first array element (e.g., when the array element represents $S^N$, S represents a natural number and N represents an integer) of the first arithmetic operation result data is more than S, the first arithmetic operation data acquiring unit 2342 of the database management server 2000 may skip the carry up arithmetic operation (e.g., an arithmetic operation of carrying up a part equal to or more than 100 to an array element representing $100^{N+1}$). As a result, the array element (e.g., the case where the array element represents the predetermined multiplier value $S^N$ of the specific number S) of the first arithmetic operation result data may include the number larger than the specific number S.

In this case, the first arithmetic operation data acquiring unit 2342 of the database management server 2000 may perform the predetermined arithmetic operation multiple times without performing the carry arithmetic operation. For example, even when the numerical value included in the array element representing $S^N$ is more than S, the first arithmetic operation data acquiring unit 2342 of the database management server 2000 continuously performs the predetermined arithmetic operation for the numerical value included in the array element without performing the carry arithmetic operation to acquire the first arithmetic operation result data.

The second arithmetic operation data acquiring unit 2344 of the database management server 2000 performs the carry arithmetic operation for the first arithmetic operation result data to acquire the second arithmetic operation result data. For example, the second arithmetic operation data acquiring unit 2344 of the database management server 2000 performs the carry up arithmetic operation for the respective numerical values included in the array element of the first arithmetic operation result data to acquire the second arithmetic operation result data.

The numerical value converting unit 2380 of the database management server 2000 may convert the second arithmetic operation result data into the numerical value. For example, the numerical value converting unit 2380 of the database management server 2000 converts the second arithmetic operation result data which exists as the type applied to the structure body into a predetermined number type to acquire the numerical value.

FIGS. 4A and 4B are diagrams for describing a method for creating a structure body according to an exemplary embodiment of the present disclosure.

The structure body according to the exemplary embodiment of the present disclosure may be created by a syntax illustrated in FIG. 4A. In this case, the structure body may include 128 array elements and each of the array elements may include the int type numerical value.

FIG. 4B is a diagram embodying a structure body created according to an exemplary embodiment of the present disclosure. The structure body may include 128 array elements and each of the array elements may represent a predetermined multiplier (e.g., . . . , 1, 0, −1, −2, . . . ) of a specific number (e.g., 100).

Figure 5A:
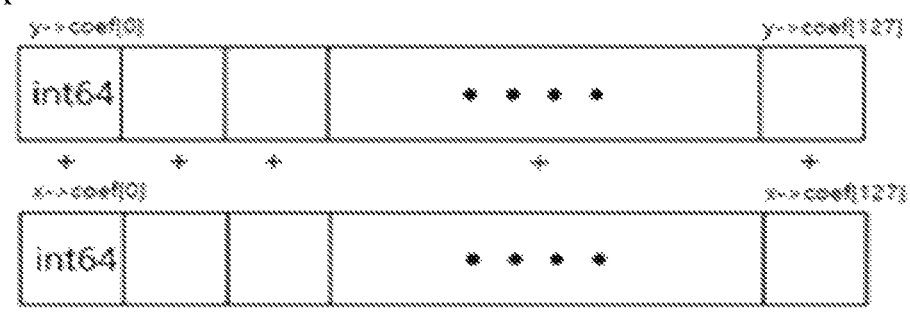
FIGS. 5A and 5B are diagrams for describing a method for performing an arithmetic operation for a numerical value according to an exemplary embodiment of the present disclosure.
Figure 5B:
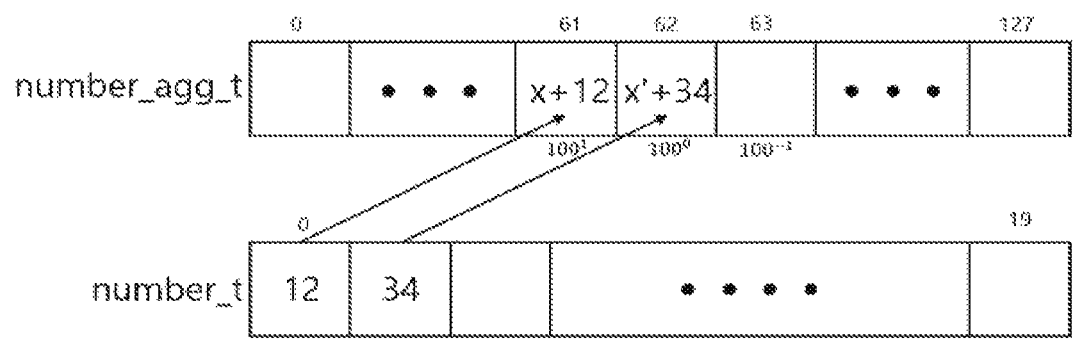

FIGS. 5A and 5B are diagrams for describing a method for performing an arithmetic operation for a numerical value according to an exemplary embodiment of the present disclosure.

According to the exemplary embodiment of the present disclosure, the database management server 2000 may apply the plurality of respective numerical values to the structure body (e.g., number_agg_t structure body or number_t structure body). In this case, the database management server 2000 may allocate at least some numerical values to one or more respective array elements. Further, the database management server 2000 may perform the predetermined arithmetic operation between the structure body number data created by being applied to the structure body.

For example, referring to FIG. 5A, the database management server 2000 may perform the arithmetic operation between the database management server 2000 and the number_agg_t structure body. In this case, the database management server 2000 may perform the predetermined arithmetic operation between the values included in the array elements representing the same multiplier of the specific number to thereby acquire the first arithmetic operation result data. In this case, the database management server 2000 may skip the carry arithmetic operation.

In this case, a size of each of the array elements may be 64 bits and is not limited thereto.

As another example, referring to FIG. 5B, the database management server 2000 may perform the arithmetic operation between the number_agg_t structure body and the number_t structure body. The database management server 2000 may perform the addition arithmetic operation for x, which is a value included between array elements 61 representing 1, a multiplier of the specific number 100 and 12 and perform the addition arithmetic operation for x', which is a value included between array elements 62 representing 0, a multiplier of the specific number 100 and 34 to thereby acquire the first arithmetic operation result data. In this case, the database management server 2000 may skip the carry arithmetic operation.

Figure 6:
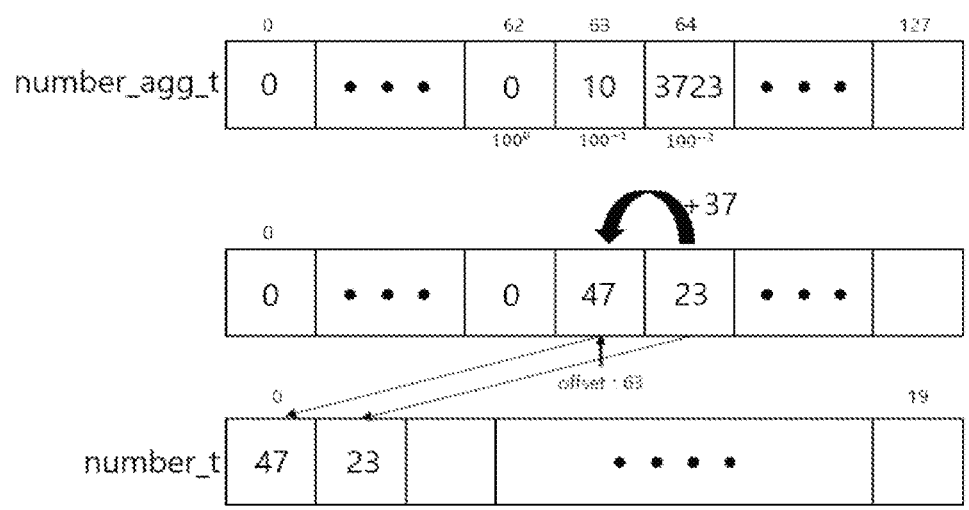
FIG. 6 is a diagram illustrating a method for performing a carry arithmetic operation according to an exemplary embodiment of the present disclosure.

FIG. 6 is a diagram illustrating a method for performing a carry arithmetic operation according to an exemplary embodiment of the present disclosure.

According to the exemplary embodiment of the present disclosure, the database management server 2000 performs the carry arithmetic operation for the first arithmetic operation result data to acquire second arithmetic operation result data. For example, the database management server 2000 performs the carry up arithmetic operation for the respective numerical values included in the array element of the first arithmetic operation result data to acquire the second arithmetic operation result data.

number_agg_t disclosed in FIG. 6 is assumed as the first arithmetic operation result data. When a number which is equal to or larger than the specific number S exits in at least one array element (in this case, the array element represents the predetermined multiplier ($S^N$) of the specific number (S)) of the first arithmetic operation result data, the database management server 2000 may perform the carry arithmetic operation for the numerical value of the corresponding array element. In this case, the carry arithmetic operation may be the carry up arithmetic operation.

Referring to FIG. 6, since 3723 exists in the array element 64 (the array element 64 represents $100^{-2}$) of the first arithmetic operation result data (number_agg_t) and 3723 is larger than the specific number (e.g., 100), the database management server 2000 may perform the carry arithmetic operation for 3723 which is the numerical value of the array element 64.

In this case, the database management server 2000 may move a part which is equal to or larger than the specific number (e.g., 100) to an array element 63 having a higher multiplier than the corresponding array element 64.

Figure 7:
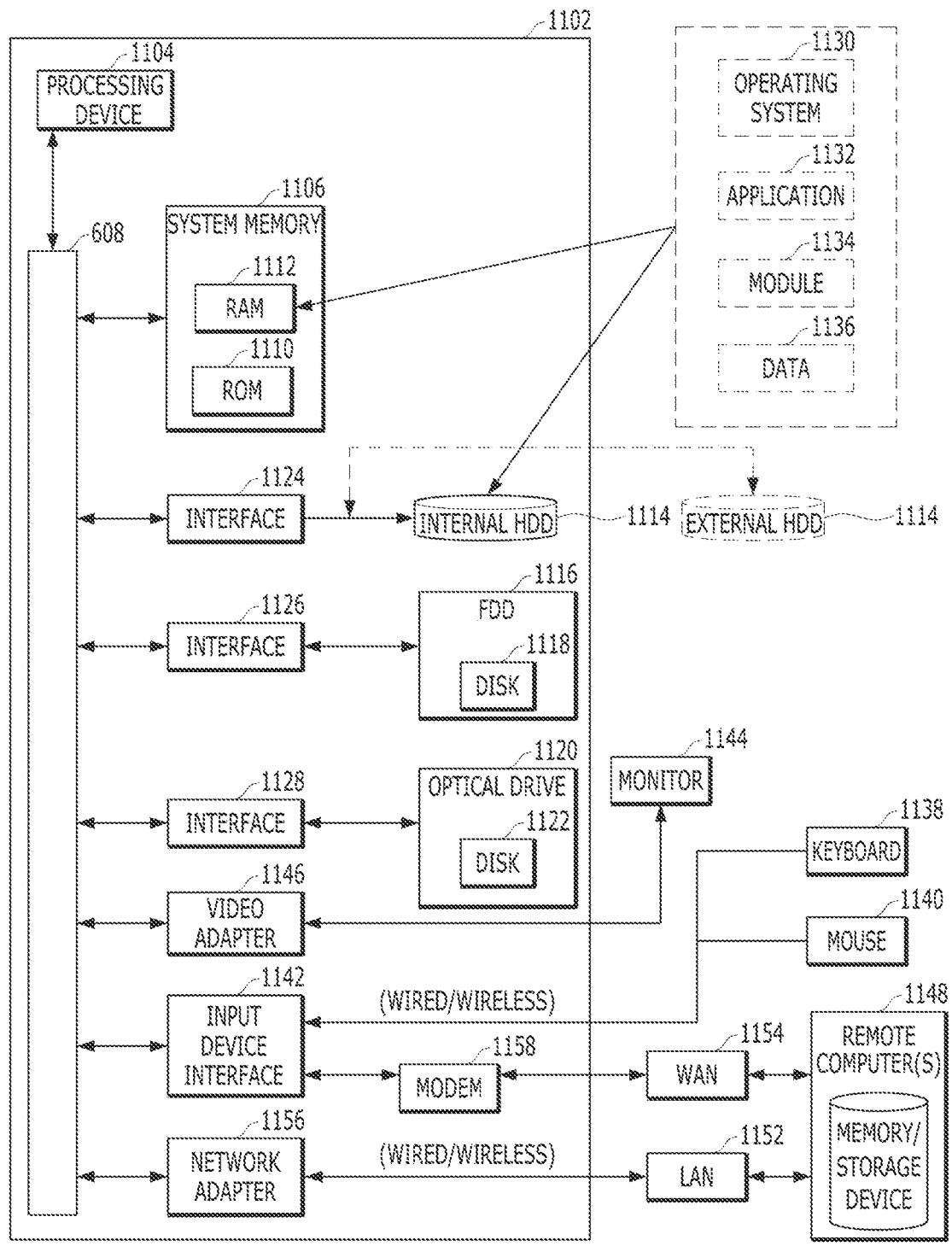
FIG. 7 is a simple and normal schematic view of an exemplary computing environment in which the exemplary embodiments of the present disclosure may be implemented.

FIG. 7 is a simple and normal schematic view of an exemplary computing environment in which the exemplary embodiments of the present disclosure may be implemented.

It is described above that the present disclosure may be generally implemented by the database management server 2000, but those skilled in the art will well know that the present disclosure may be implemented in association with a computer executable command which may be executed on one or more computers and/or in combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As not a limit but an example, the computer readable media may include both computer readable storage media and computer readable transmission media. The computer readable storage media include volatile and non-volatile media, temporary or non-temporary media, and movable and non-movable media implemented by a predetermined method or technology for storing information such as a computer readable command, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by configuring or changing at least one of characteristics of the signal so as to encode information in the signal. As an example rather than a limit, the computer readable transmission media include wired media such as a wired network or a direct-wired connection and wireless media such as acoustic, RF, infrared and other wireless media. A combination of anymedia among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor or other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an embedded hard disk drive (HDD) 1114 (for example, EIDE and SATA), herein, the embedded hard disk drive 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable command, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached by the RAM 1112. It will be well appreciated that the present disclosure may be implemented in various operating systems which are commercially usable or a combination of the operating systems.

A user may input commands and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer(s) 1148 may be a workstation, a computer device computer, a router, a personal computer, a portable computer, a microprocessor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication in the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and a Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as a device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercom patibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Various exemplary embodiments presented herein may be implemented as manufactured articles using a method, an apparatus, or a standard programming and/or engineering technique. The term "manufactured article" includes a computer program, a carrier, or a medium which is accessible by a predetermined computer-readable storage device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the embodiments presented herein, but should be analyzed within the widest range which is consistent with the principles and new features presented herein.

What is claimed is:

1. A non-transitory computer-readable medium including a computer program including encoded commands, which is configured to cause one or more processors to perform a process when the computer program is executed by the one or more processors of a database computer system, wherein the process comprises:

receiving a structure body creation request for performing a predetermined accumulative arithmetic operation on a plurality of numerical values stored in memory of the database computer system by a network;

creating a structure body including array elements in response to the structure body creation request by the network, wherein the number of the created structure bodies is plural;

receiving an arithmetic operation processing request for processing of the predetermined arithmetic operation with respect to the plurality of numerical values stored in the memory of the database computer system by the network;

creating structure body number data for each of the plurality of the numerical values stored in the memory of the database computer system by applying each of the plurality of the numerical values stored in the memory of the database computer system to the created structure body, the created structure body including one or more array elements and at least some of the numerical values being allocated to the one or more array elements to create the structure body number data by the one or more processors of the database computer system; and performing the predetermined arithmetic operation based on the structure body number data for each of the plurality of the numerical values to acquire an arithmetic operation result data, wherein the size of each of the array elements of the plurality of structure bodies are different from each other.

2. The non-transitory computer-readable storage medium of claim 1, wherein the performing of the predetermined accumulative arithmetic operation to a plurality of numerical values stored in memory of the database computer system by a network includes:

acquiring first arithmetic operation result data by performing the predetermined accumulative arithmetic operation for the structure body number data for each of the plurality of the numerical values stored in the memory of the database computer system by network, and creating second arithmetic operation result data by performing a carry arithmetic operation for the first arithmetic operation result data, the carry arithmetic operation including at least one of a carry up arithmetic operation and a carry down arithmetic operation, and the process performed by the one or more processors of the database computer system further including converting the second arithmetic operation result data into a number.

3. The non-transitory computer-readable storage medium of claim 2, wherein in the acquiring of the first arithmetic operation result data, the carry arithmetic operation regarding the numerical value stored in the memory of the database system is skipped by the one or more processors of database computer system during the performing of the predetermined accumulative arithmetic operation.

4. The non-transitory computer-readable storage medium of claim 1, wherein each of the one or more array elements represents a predetermined multiplier of a specific number, and wherein the operation of acquiring the first arithmetic operation result data includes performing the predetermined arithmetic operation between values possessed by the array element in which the predetermined multiplier is identical.

5. The non-transitory computer-readable storage medium of claim 1, wherein the operation of performing the predetermined arithmetic operation based on the structure body number data for each of the plurality of numerical values to acquire an arithmetic operation result data includes:

performing the predetermined arithmetic operation with a first structure body and a second structure body, wherein the first structure body has a first size of the array elements and the second structure body has a second size of the array elements, and wherein the first size of the array elements and the second size of the array elements are different from each other.

6. The non-transitory computer-readable storage medium of claim 1, wherein in the creating of the structure body number data, each of the plurality of the numerical values is divided based on a multiplier of 100 to create the structure body number data.

7. The non-transitory computer-readable medium of claim 1 wherein, the predetermined arithmetic operation includes an addition arithmetic operation of the numerical values stored in the memory of the database computer system.

8. A database server having memory and a processor for performing a predetermined accumulative arithmetic operation, the server comprising:

a structure body creator configured to receive a structure body creation request for performing a predetermined accumulative arithmetic operation on a plurality of numerical values stored in memory of the database server by a network and create a structure body including array elements in response to the structure body creation request by the network, wherein the number of the created structure bodies is plural;

a structure body number data creator configured to receive an arithmetic operation processing request for the predetermined arithmetic operation for a plurality of numerical values stored in the memory of the database server by the network and create structure body number data for each of the plurality of the numerical values stored in the memory of the database server by the network by applying each of the plurality of the numerical values stored in the memory of the database server by the network to the created structure body, the created structure body including one or more array elements and at least some of the numerical values being allocated to the one or more array elements to create the structure body number data by the one or more processors of the database server; and an arithmetic operation processor configured to perform the predetermined arithmetic operation based on the structure body number data for each of the plurality of the numerical values to acquire an arithmetic operation result data, wherein the size of each of the array elements of the plurality of structure bodies are different from each other.

9. The server of claim 8, wherein the arithmetic operation processor of the database computer system includes:

a first arithmetic operation data receiver configured to acquire first arithmetic operation result data by performing the predetermined accumulative arithmetic operation for the structure body number data for each of the plurality of the numerical values stored in the memory of the database computer system by network, and a second arithmetic operation data receiver configured to create second arithmetic operation result data by performing a carry arithmetic operation for the first arithmetic operation result data, the carry arithmetic operation including at least one of a carry up arithmetic operation and a carry down arithmetic operation, and the server further including a numerical value converter configured to convert the second arithmetic operation result data into a number.

* * * * *